Oct. 25, 1927.

A. M. ALCAZAR 1,646,739

HOUSING

Original Filed Sept. 16, 1922  2 Sheets-Sheet 1

Inventor
Alcides M. Alcazar.
By his Attorneys

Oct. 25, 1927.

A. M. ALCAZAR 1,646,739

HOUSING

Original Filed Sept. 16, 1922    2 Sheets-Sheet 2

Inventor

Alcides M. Alcazar.

By his Attorneys

Patented Oct. 25, 1927.

1,646,739

UNITED STATES PATENT OFFICE.

ALCIDES M. ALCÁZAR, OF BROOKLYN, NEW YORK, ASSIGNOR TO METER SERVICE CORPORATION, OF NEW YORK, N. Y., A CORPORATION OF NEW YORK.

HOUSING.

Application filed September 16, 1922, Serial No. 588,734. Renewed January 12, 1927.

My invention relates to a housing and aims to provide a device of this character which is particularly adapted for use in connection with a meter box or similar structure.

It is a well appreciated fact in connection with electric service that it has been customary to provide a mounting plate which serves to carry the electric meter and a fuse box, etc., as well as supporting the leads connected with the various parts. It is also well understood that numerous objections have been noted incident to the use of a construction of this nature, and probably the most serious of these objections is to be predicated to the fact that numerous consumers of the current have tapped the leads and bridged across the meter so that they have obtained electric current without this consumption having been recorded by the meter. Thus the parties supplying the current have been unable to enter a charge for the actual current consumed, and this unauthorized consumption of current as an aggregate entailed a considerable financial loss to the parties supplying the same.

Another objection has been found in that the conventional supporting plates have usually carried the meter in such a manner and have in turn been supported upon a wall or similar surface in such a way that vibrations of the surface have been transmitted to the meter and thus caused an improper operation of the same, and in many instances due to the disposition of the leads with respect to the meter a magnetic field has been set up which has caused a creeping of the meter and a consequent improper recording of the current actually utilized by the consumer.

Still another criticism to construction of this nature is based upon the fact that the leads are disposed in such a manner that an inspector testing the meter has often been burnt or severely shocked by the current and in addition to this objection the leads have been disposed in such a manner that while the meter was being tested the inspector, although using proper care, has short-circuited the parts and blown the fuses.

With these and further objections in mind my present invention has reference to a housing which will present such a construction as to absolutely preclude any unauthorized use of the current, or in other words a tapping of the leads and bridging across the meter, without this use necessitating a mutilation of the housing and rendering this tapping apparent.

A further object of ths invention is that of providing a device of the character stated which will present a structure serving to reduce to a minimum the vibrations on the part of the meter.

Another object of my present invention is that of constructing a housing in which the leads will be disposed in such a manner as to prevent any magnetic field being set up so that the meter will not creep, it being noted in this connection that these leads are also arranged in such a manner that the inspector will not be burned or shocked while testing the meter, and also the likelihood of a fuse being blown incident to the setting up of a short-circuit during the testing operation, will be reduced to a minimum.

A still further object of this invention is that of providing a construction of extreme simplicity consistent with accomplishing the objects aforementioned.

With these and further objects in mind, the present invention consists essentially of an improved construction of housing comprising a mounting plate for a meter or similar member, and also providing housing for the leads, cut-outs, etc., which housing may be locked against unauthorized opening by a single means.

Reference is had to the attached sheets of drawings which illustrate one practical embodiment of my invention, and it will be seen in these drawings that Fig. 1 is a top plan view of the housing embodying my improved form of construction.

Figure 1:
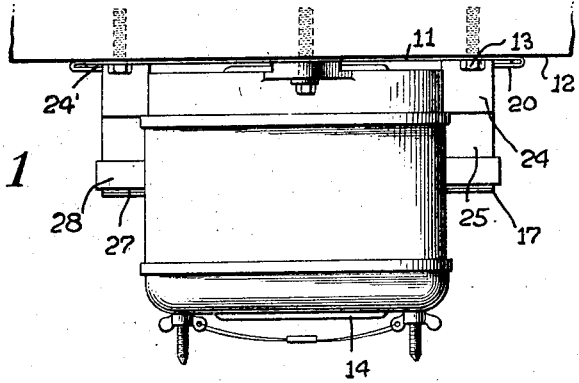
Figure 2:
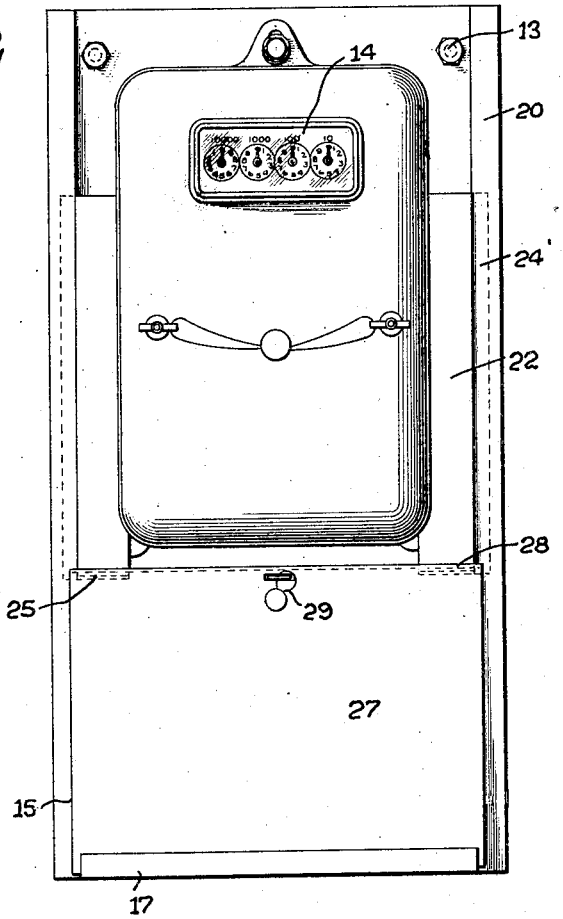
Fig. 2 is a face view thereof.
Figure 4:
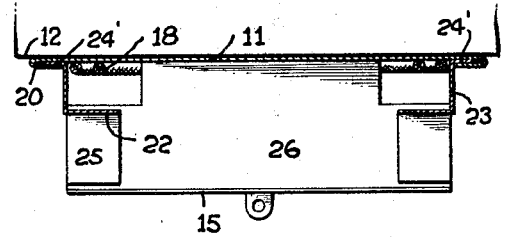
Fig. 4 is a transverse sectional view taken along the lines 4—4 and in the direction of the arrow indicated on Fig. 3
Figure 3:
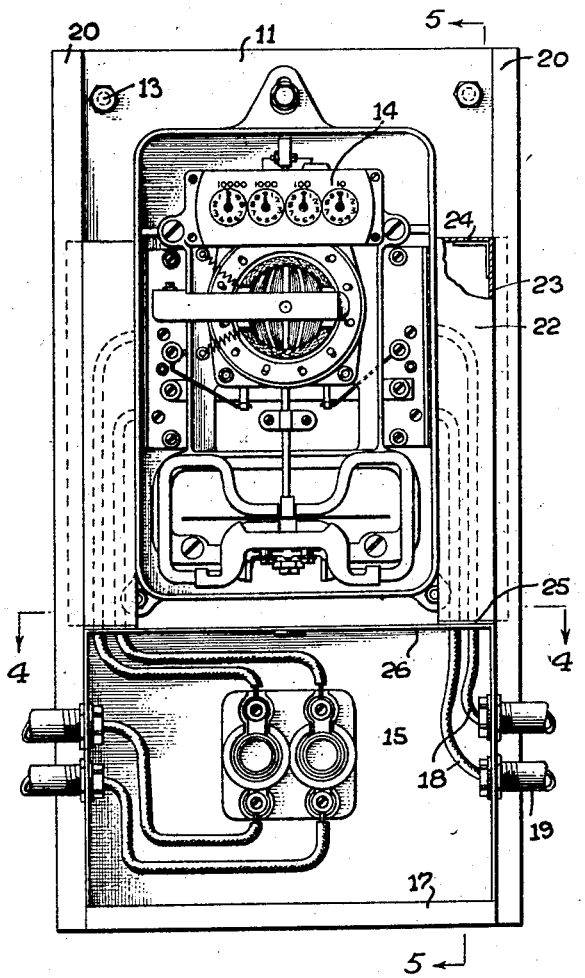
Fig. 3 is a view similar to Fig. 2, but showing the cover for the meter and a cover of the portion of the housing forming a service box or enclosure for the cut-out or other devices removed.

It will be seen in these various views that the reference numeral 11 indicates a backing plate, which contrary to conventional construction preferably consists in a sheet of flat metal the rear face of which lies flush against the supporting surface 12 to which it is attached by any suitable means such as lugs 13, the forward face of the plate directly supporting the meter 14, which may be of any desirable construction. Thus the liability of movement of the backing plate with respect to the supporting surface is reduced to a minimum, as is also the liability of movement of the meter with respect to the supporting surface. Thus the objection hereinbefore noted incident to vibration of the meter is entirely overcome.

Also contrary to conventional construction it will be noted that the box 15 constituting the service box or enclosure for the cut out or other accessories employed in connection with the meter installation and carried by the supporting base or backing plate has its lower wall 16 extending beyond its body and terminating in an upturned edge 17, but in the usual manner the box 15 is provided with openings and the leads 18 may enter or emerge from the box through these openings, it being of course understood that these leads are enclosed in protective casings or conduits 19 at points beyond the said box.

It will further be seen that these leads contrary to conventional arrangements are disposed in groups one at each side of the meter 14, with which they are arranged in series. Thus any danger of a magnetic field being set up is avoided, it being further noted that ample space is provided upon each side of the meter for the accommodation of the leads, thus enabling an inspector to work with greater ease and facility, as well as reduce the liability of his being burnt or shocked, aside from the fact that during the testing operation but little danger of a fuse being blown will exist.

Now with a view of preventing a tapping of the leads for the unauthorized use of current, it will be seen that I have turned the side edges of the backing plate inwardly as has been indicated at 20 and thus grooves are provided adjacent these side edges. Slidably mounted within these grooves are lead-housings, which when the device is assembled form continuations of the box or housing 15 and align with openings 21 formed in the upper wall of the latter, the leads passing through these openings in their course to the meter as has been aforementioned. These housing each include an outer wall 22, a side wall 23 and an end wall 24, and the side wall 23 has its innermost edge bent outwardly as at 24', and is of sufficient width to extend into the groove provided by each of the inwardly turned edge portions 20 on the backing plate 11.

Also it will be noted that these housings each have their outer wall 23 continued in the form of an outwardly extended portion 25 which, when the parts are in applied position lies flush against the upperwall 26 of the box 15, and a cover 27 is provided for this latter member which cover presents an inwardly turned upper edge portion 28 adapted to overlap both the upper wall 26 and outwardly extending portion 25 of the housing.

Figure 5:
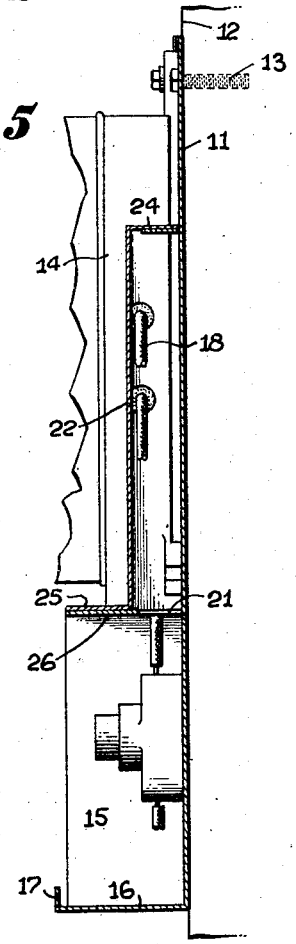
Fig. 5 is a longitudinal section taken along the lines 5—5 and in the direction of the arrow also indicated on Fig. 3.

Thus assuming that the parts are in the position shown in Fig. 5 it will be understood that by the application of the cover 27 to the box 15 is effected in such a manner, that the lower edge of the cover is overlapped by the upwardly extending portion 17 of the box 15, and the inwardly extending portion 28 of the cover in turn overlaps the upper wall 26 and outwardly extending portion 25, that the cover will prevent any movement of the lead housings with respect to its body, and will in turn be prevented from movement with respect to the box 15. When, however, the cover is removed the housing may be slid upwardly with their edges moving in the groove afforded by the over-turned edges of the backing plate. Thus a single seal 29 associated with the cover will prevent first, any removal of this member from the box, and secondly any removal of the housing from the backing plate.

It will be noted in this connection that the leads are fully enclosed and thus a tapping of the same is precluded, but in the event that an inspector or other authorized person desires to examine the parts this may readily be accomplished by breaking the seal 29, removing the cover 27 and then sliding the housing upwardly to expose the leads and if desired entirely removing said housings from the backing plate.

From the foregoing it will be understood that the objects of my invention have been accomplished in that a housing is provided which is ideally adapted as a meter mounting, and which will first prevent any unauthorized use of current; second, prevent the meter from vibrating; third, in which due to the disposition of the leads, no magnetic field is set up, so that no creeping of the meter will exist; fourth, the construction and arrangement of the parts is such that an inspector may readily examine and test the same without burning or shocking himself, or blowing a fuse; fifth, the construction being further of such a nature that all of the parts may be locked against removal by a single unit (the seal 29) and in which finally the construction is of such a simple nature as to be commercially practical.

It will also be understood that numerous modifications of structure may be resorted to without the slightest departing from the spirit of my invention as defined by my claims.

What I claim is:

1. A device of the character described including in combination a backing plate having its edges turned inwardly, a meter carried by said plate and having its sides spaced from the side edges of said plate, leads operatively connected to said meter and extending within said space, and housings for said leads having side walls whose edges are bent outwardly to extend into the groove provided by the turned-over side edge of the backing plate.

2. A device of the character described including in combination a backing plate having vertical guides, a meter carried by said plate and having its sides spaced from the side edges of said plate, leads operatively connected to said meter and extending within said space, a service box or housing and vertically sliding housings for said leads having side walls engaged with and sliding in the vertical guides of the backing plate.

3. A meter mounting including a plate, a meter carried upon said plate and having its sides spaced from the edges of said plate, leads extending within the spaces thus provided and operatively connected with said meter, a box carried by said plate and having a lower wall terminating in an upturned edge, said leads extending within said box, vertically sliding housings for said leads having a wall continued in an outwardly extended portion, vertical guides on said plate for the housings, and a cover for closing said box having an inwardly turned upper edge portion and co-operating with said housings for locking the same against movement with respect to said plate.

4. In a device of the character described, the combination of a backing plate having vertically arranged guides, a service box and a meter secured thereto and housings for the leads extending from the service box to the meter and having each an outer wall extended forwardly over the service box, an end wall and a side wall slidably engaged with the vertically extending guides of the backing plate and a cover plate for the box engaged with said housings to prevent a sliding movement of them.

5. In a device of the character described, the combination of a backing plate, a meter secured thereto, a service box also secured to said backing plate, vertically slidable housings for the leads running from the service box to the meter, vertical guides connecting the housings with the backing plate and a cover plate for the box engaged at its bottom edge with an upwardly extending edge of the lower wall of the box and having an upper edge portion overlapping the housings to lock them against sliding movement.

Signed at New York in the county of New York and State of New York this 15th day of Sept. A. D. 1922.

ALCIDES M. ALCÁZAR.